3,546,282
PROCESS FOR THE PRODUCTION OF ALKALI
AROMATIC DICARBOXYLATES
Tamotsu Murase and Ichiro Mikami, both of 30 Tokumaru-cho, Itabashi-ku, Tokyo, Japan, and Moriyoshi Tamura and Masaoki Matsuda, both of 4918 Kanoezuka-machi, Ohi, Shinagawa-ku, Tokyo, Japan
No Drawing. Filed Feb. 10, 1965, Ser. No. 431,708
Claims priority, application Japan, Feb. 18, 1964,
39/8,373
Int. Cl. C07c 63/28
U.S. Cl. 260—515                    9 Claims

ABSTRACT OF THE DISCLOSURE

Process for producing alkali terephthalate by the reaction of alkali benzoate with alkali carbonate and carbon monoxide at a relatively high temperature under pressure of a gaseous mixture of carbon monoxide and carbon dioxide and in the presence of a catalyst, while avoiding the presence of oxygen and water in the reaction system.

This invention relates to a process for the production of alkali aromatic dicarboxylates and free acids therefrom. More particularly, it relates to a process for the production of alkali aromatic dicarboxylates from alkali aromatic monocarboxylates under the pressure of a mixture of carbon monoxide and carbon dioxide, in the presence of potassium carbonate and a catalyst.

It is well known that alkali aromatic monocarboxylate such as potassium benzoate is heated in the presence of potassium carbonate and under the pressure (usually less than 400 atmospheres) to produce alkali aromatic dicarboxylate such as potassium terephthalate. The formulas for the possible reactions in this method are given below:

$$2C_6H_5COOK \longrightarrow C_6H_4(COOK)_2 + C_6H_6 \quad (1)$$

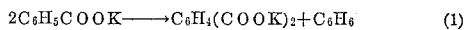
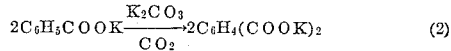

However, in this method, at best 0.5 mol of total aromatic dicarboxylates containing terephthalate can be produced from 1 mol of potassium benzoate and besides about 0.5 mol of benzene is produced as by-product. Therefore, it is considered that in the above method the above reaction (1) predominantly takes place and the reaction (2) scarcely occurs. In fact, carbon dioxide hardly participates in the reaction.

As regards the above method, in order to promote the reaction (2) for the increase of the yield of dicarboxylates up to more than 0.5 mol per 1 mol of benzoate and reduce the by-production of benzene, some improvements have been suggested. In the improvement, the reaction is carried out either under the high pressure more than 400 atmospheres (preferably higher than 1000 atmospheres) of carbon dioxide, or in the addition of potassium cyanate; or in the coexistence of an alkali salt of other organic acid, such as potassium salicylate; or with the addition of large excess of acid-binding agent such as potassium carbonate. However, neither of these improvemenst is so satisfactory.

Previously, we found that carbon monoxide participated in the reaction when gaseous carbon monoxide was employed instead of carbon dioxide in the above method. More particularly, we found that when gaseous carbon monoxide was employed, more than 0.5 mol of total alkali aromatic dicarboxylates could be produced from 1 mol of alkali aromatic monocarboxylate in the presence of alkali carbonate, even at a pressure lower than 400 atmospheres. The formula for this reaction is shown as follows:

$$C_6H_5COOK + CO + K_2CO_3 \rightarrow C_6H_4(COOK)_2 \quad (3)$$

According to this prior method, the total dicarboxylates amounts to more than 0.5 mol and the by-production of benzene is hardly recognizable. However, the proportion of terephthalate in the total dicarboxylates is still low. Accordingly, in order to obtain a higher yield of terephthalate, it is required that the reaction be carried out in many stages, recycling unreacted material and by-products.

It is one object of this invention to increase the proportion of terephthalate in the total dicarboxylates produced in one reaction, without lowering the yield of the total dicarboxylates.

Other objects and advantages of this invention will be apparent from the following descriptions.

This invention provides a process for the production of alkali aromatic dicarboxylates, which comprise the reaction of alkali aromatic monocarboxylate with alkali carbonate and carbon monoxide at a temperature from 250° C. to 500° C. under the pressure of a gaseous mixture of carbon monoxide and carbon dioxide in the presence of a catalyst.

The reaction of this invention, potassium benzoate being employed for example, can be given in the following formula:

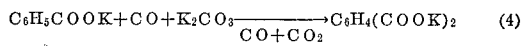

As the starting material of this invention, an alkali aromatic monocarboxylate is used. Aromatic monocarboxylate includes benzoate, methyl benzoate, naphthoate, and such like. Alkali includes potassium, lithium, sodium, cesium and such like. Potassium benzoate is especially preferred when terephthalate is the desired object. When potassium benzoate is employed, the major part of dicarboxylates produced, is terephthalate, while in case of sodium benzoate, a mixture of terephthalate and other phthalates is produced.

As alkali carbonates, potassium carbonate is most suitable, but lithium, sodium or cesium carbonate may also be used. The molar amount of these alkali carbonates is preferably equal to or larger than that of the alkali aromatic monocarboxylate as starting material.

As catalyst, active carbon, metallic cadmium, zinc, iron, titanium, lead, copper, aluminum and silicon or compounds of these metals such as oxides, halides, carbonates, organic acid salts and complex salts are preferably used. The catalyst is usually used in an amount of 0.05% wt. to 25% wt. based on the alkali aromatic monocarboxylate, which is starting material, but may also be used in a larger amount.

The reaction is carried out under the pressure of a gaseous mixture of carbon monoxide and carbon dioxide. The molar ratio of carbon monoxide to carbon dioxide (CO:CO$_2$) is preferably selected from between 90:10 and 10:90, and most preferably from between 70:30 and 30:70. By the use of the mixture of carbon monoxide and carbon dioxide, especially in the preferable molar ratio range, the total amount of dicarboxylates produced from 1 mol of monocarboxylate is increased compared with the case where carbon dioxide alone is employed, and the proportion of terephthalate in the total dicarboxylates is also increased compared with the case where carbon monoxide alone is employed. Thus, the yield of terephthalate can be increased by 40% or more in comparison with the case where carbon monoxide alone is employed, and possibly amounts to 0.5 mol or more per 1 mol of monocarboxylate in one reaction.

The gaseous mixture may contain an inert gas or gases such as nitrogen, hydrogen, methane or other gaseous paraffinic and olefinic hydrocarbons, besides gaseous carbon monoxide and carbon dioxide.

The pressure during the reaction may vary within the wide range from 10 to 1000 atmospheres or more, preferably 100 to 400 atmospheres. Practically, a pressure up to 300 atmospheres is sufficient.

The reaction is effected at a temperature higher than 250° C. The most convenient temperature, which depends on the catalyst and the other conditions such as pressure, ranges from 380° C. to 480° C. Generally, at the temperature of over 500° C. the decomposition of the organic material and product becomes substantial and leads to carbonization, so that it should be avoided to maintain the reaction system at such a high temperature for a substantial space of time.

Upon carrying out the reaction, especially presence of water in the reaction system should be avoided. In addition, it is desirable to eliminate oxygen from the system as far as possible.

In the working of this process, beforehand the starting materials should be completely dried by the conventional methods to be free of water, and then crushed and admixed well in a ball mill or such like. The materials are introduced in an autoclave with a stirrer or a rotary autoclave, and then the reaction is carried out while the materials being stirred under the pressure of a gaseous mixture containing carbon monoxide and carbon dioxide in a suitable molar ratio. After the reaction is completed, the reaction mixture is removed out of the autoclave and dissolved in water. The water-insoluble precipitates are filtered off, and the filtrate is separated. By the addition to the filtrate of generally each one or the mixture of such mineral acids as hydrochloric acid, sulfuric acid, nitric acid, carboxylates are changed into carboxylic acids and water-insoluble dicarboxylic acids such as terephthalic acid are precipitated. The water-insoluble dicarboxylic acids are separated by filtration, washed with water, and dried. On the other hand, from the filtrate water-soluble carboxylic acids such as isophthalic acid, trimesic acid and benzoic acid are recovered by extraction with ether and with acetone.

The following examples are intended to illustrate this invention and should not be understood to restrict the invention.

EXAMPLE 1

5 g. of potassium benzoate, 10 g. of potassium carbonate and, as catalyst, 0.5 g. of cadmium fluoride and 0.5 g. of active carbon were crushed together and admixed well and dried sufficiently.

This admixture was introduced into an autoclave of inside volume 100 cc. and oxygen was eliminated sufficiently by substitution of $CO_2$ ($N_2$ or other harmless gas may be used).

Then, the gaseous mixture of carbon monoxide and carbon dioxide in the molar ratio of 10:90 was filled up to 120 atm., and the autoclave was heated at 430° C. for 1.5 hours. The maximum pressure during the reaction was 260 atm.

After the reaction was completed, the reaction product was removed and dissolved in hot water. Insoluble precipitates were filtered off. The transparent filtrate, after heating, was made acidic by adding hydrochloric acid. The formed white precipitates of terephthalic acid was filtered by suction while hot and then washed with water. The yield of the terehpthalic acid was 2.7 g. On the other hand, from the filtrate, total 0.2 g. of extracts was obtained by extraction with ether and acetone. The extracts were observed to contain benzoic acid, isophthalic acid and trimesic acid under the infrared absorption spectrum examination. The amount of the by-production of benzene in said reaction was 1.1 g.

EXAMPLE 2

The same procedure was used as Example 1 except that the reaction was carried out under the pressure of gaseous carbon dioxide only.

The obtained terephthalic acid was 2.4 g., the extracts with ether and with acetone from the filtrate were 0.2 g., and the by-produced benzene was 1.2 g.

EXAMPLE 3

The same procedure was used as Example 1 except that the gaseous mixture of carbon monoxide and carbon dioxide in the molar ratio of 30:70 was used.

The obtained terephthalic acid was 3.1 g., the extracts with ether and with acetone were 0.2 g., and the by-produced benzene was 0.9 g.

EXAMPLE 4

The same procedure as Example 1 was used except that the molar ratio of carbon monoxide to carbon dioxide was 50:50.

The obtained terephthalic acid was 3.3 g., the ether and acetone extracts was 0.2 g., and the by-produced benzene was 0.7 g.

EXAMPLE 5

The same procedure as Example 1 was used except that the molar ratio of carbon monoxide to carbon dioxide was 70:30.

The obtained terephthalic acid was 3.2 g., the ether and acetone extracts were 0.3 g., and the by-produced benzene was 0.4 g.

EXAMPLE 6

The same procedure as Example 1 was used except that the molar ratio of carbon monoxide to carbon dioxide was 90:10.

The obtained terephthalic acid was 2.5 g., the ether and acetone extracts were 1.0 g., and the by-produced benzene was 0.2 g.

EXAMPLE 7

The same procedure as Example 1 was used except that the reaction was carried out under the pressure of gaseous carbon monoxide only.

The obtained terephthalic acid was 2.1 g., the ether and acetone extracts were 1.5 g., and the by-produced benzene was in a very small amount.

EXAMPLE 8

5 g. of potassium benzoate, 10 g. of potassium carbonate and, as catalyst, 0.5 g. of cadmium fluoride and 0.2 g. of active carbon were treated and introduced into the autoclave as in Example 1. So as to get the molar ratio 40:30:30 of carbon monoxide, carbon dioxide and nitrogen respectively, each gas was pumped into the autoclave. The reaction was carried out at 435° C. for 1.5 hours. The maximum pressure during the reaction was 290 atm.

After the reaction was completed, the reaction product was treated as in Example 1. The obtained terephthalic acid was 3.3 g., the ether and acetone extracts were 0.2 g., and the by-produced benzene was 0.6 g.

EXAMPLE 9

5 g. of potassium benzoate, 10 g. of potassium carbonate and, as catalyst, 0.5 g. of iron oxide and 0.2 g. of active carbon were treated and introduced into the autolave as in Example 1. The gaseous mixture of carbon monoxide and carbon dioxide in the molar ratio of 75:25 was pumped into the autoclave up to 130 atm. The reaction was carried out at 435° C. for 1.5 hours. The maximum pressure during the reaction was 300 atm.

After the reaction was completed, the reaction product was treated as in Example 1. The obtained terephthalic acid was 2.2 g., the ether and acetone extracts were 1.0 g., and the by-produced benzene was 0.5 g.

EXAMPLE 10

The same procedure as Example 9 was used except that the catalyst, 0.5 g. of titanium oxide and 0.2 g. of active carbon were used. The maximum pressure was also 300 atm. in this example.

The obtained terephthalic acid was 1.1 g., the ether and acetone extracts were 2.5 g., and the by-produced benzene was 0.2 g.

EXAMPLE 11

The same procedure as Example 9 was used except that as catalyst, 0.6 g. of lead oxide and 0.2 g. of active carbon were used.

The obtained terephthalic acid was 0.6 g., the ether and acetone extracts were 3.0 g., and the by-produced benzene was 0.2 g.

EXAMPLE 12

The same procedure as Example 9 was used except that as catalyst, 1.0 g. of zinc oxide was used.

The obtained terephthalic acid was 2.8 g., the ether and acetone extracts were 0.3 g., and the by-produced benzene was 0.8 g.

What we claim is:

1. A process for the production of alkali terephthalate by reaction of alkali benzoate with alkali carbonate and carbon monoxide, which comprises carrying out the reaction at a temperature from 250° C. to 500° C. under a pressure of 10–1000 atmospheres of a gaseous mixture of carbon monoxide and carbon dioxide in a molar ratio of between 10:90 and 90:10 and in the presence of a catalyst consisting essentially of at least one member selected from the group consisting of oxides, halides, carbonates, organic acid salts and complex salts of cadmium, zinc, iron, titanium, lead, and active carbon while avoiding the presence of oxygen and water in the reaction system.

2. The process of claim 1, wherein the catalyst consists of iron oxide and active carbon.

3. The process of claim 1, wherein the catalyst consists of titanium oxide and active carbon.

4. The process of claim 1, wherein the catalyst consists of lead oxide and active carbon.

5. The process of claim, wherein the catalyst consists of zinc oxide.

6. A process according to claim 1 wherein the alkali benzoate is potassium benzoate.

7. A process according to claim 1 wherein the alkali carbonate is potassium carbonate.

8. A process for obtaining potassium terephthalic by the reaction of potassium benzoate with potassium carbonate and carbon monoxide, which comprises carrying out the reaction at a temperature from 380° to 480° C. under a pressure from 100 to 400 atmospheres of a gaseous mixture of carbon monoxide and carbon dioxide in a molar ratio between 30:70 and 70:30 and in the presence of a catalyst consisting of cadmium fluoride and active carbon, while avoiding the presence of oxygen and water in the reaction system.

9. A process according to claim 1 wherein the gaseous mixture contains an inert gas in addition to carbon dioxide.

References Cited

UNITED STATES PATENTS

| 2,794,830 | 6/1951 | Raecke et al. | 260—515 |
| 2,863,914 | 12/1958 | Raecke | 260—515 |
| 2,931,829 | 4/1960 | Schenk | 260—515 |

FOREIGN PATENTS

| 3,924,448 | 10/1964 | Japan | 260—515 |

OTHER REFERENCES

Sherwood, Terephthalic Acid by Isomerization and Disproportionation, Chemistry and Industry Aug. 27, 1960 pp. 1096–1100.

JAMES A. PATTEN, Primary Examiner